(12) United States Patent  
Diaz

(10) Patent No.: US 7,198,414 B2
(45) Date of Patent: Apr. 3, 2007

(54) PLANAR DECOUPLING IN OPTICAL SUBASSEMBLY

(75) Inventor: Nelson Diaz, Westminster, CO (US)

(73) Assignee: Finisar Corporation, Sunnyvale, CA (US)

( * ) Notice: Subject to any disclaimer, the term of this patent is extended or adjusted under 35 U.S.C. 154(b) by 113 days.

(21) Appl. No.: 11/021,475

(22) Filed: Dec. 22, 2004
(Under 37 CFR 1.47)

(65) Prior Publication Data

US 2006/0133743 A1  Jun. 22, 2006

(51) Int. Cl.
*G02B 6/36* (2006.01)
(52) U.S. Cl. .......................................... 385/92; 385/88
(58) Field of Classification Search ............. 385/88–94
See application file for complete search history.

(56) References Cited

U.S. PATENT DOCUMENTS

| 6,264,481 | B1 | 7/2001 | Kozel et al. |
| 6,335,869 | B1 | 1/2002 | Branch et al. |
| 6,371,663 | B1 | 4/2002 | Kneier et al. |
| 6,682,231 | B2 | 1/2004 | Meyer et al. |
| 6,752,663 | B2 | 6/2004 | Bright et al. |
| 6,817,782 | B2 * | 11/2004 | Togami et al. ................. 385/92 |

* cited by examiner

*Primary Examiner*—Kevin S. Wood
(74) *Attorney, Agent, or Firm*—Workman Nydegger

(57) ABSTRACT

An optical transceiver includes a housing, a circuit board, an optical subassembly and a decoupling disk. The circuit board is configured to be coupled within the housing. The optical subassembly has a can and a barrel and the optical subassembly is coupled within the housing. The decoupling disk is coupled to the can of the optical subassembly.

18 Claims, 3 Drawing Sheets

PLANAR DECOUPLING IN OPTICAL SUBASSEMBLY

BACKGROUND

The present invention relates to an optical subassembly. More particularly, the optical subassembly of the present invention is provided with planar decoupling.

An optical subassembly is typically configured to be received in a transceiver module and is used to transform optical signals coming from optical fibers to an electrical signal, or to transform an electrical signal to an optical signal. A photodiode, pin diode, or similar optical receiver contained by the optical subassembly transforms the optical signal to the electrical signal and then sends the electrical signal to a processing circuit. A laser diode, pin diode or similar optical emitter contained within the optical subassembly transforms the electrical signal coming from the processing circuit to the optical signal.

The process of converting optical signals to electrical signals and electrical signals to optical signals in a relatively small package produces a significant amount of noise in the conversion process. This generated noise can produce signal denigration if not adequately compensated for or eliminated. Internally decoupling signals using capacitors in the circuitry that converts the signals can be one way of effectively minimizing noise in some instances. If a transceiver is not equipped with such internal decoupling circuitry, however, it is not possible to practically add such circuitry. Also, in some cases such internal decoupling circuitry is not effective to reduce all noise signals. For these and other reasons, there is a need for the present invention.

SUMMARY

One aspect of the present invention provides an optical transceiver. The optical transceiver includes a housing, a circuit board, an optical subassembly and a decoupling disk. The circuit board is configured to be coupled within the housing. The optical subassembly has a can and a barrel and the optical subassembly is coupled within the housing. The decoupling disk is coupled to the can of the optical subassembly.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the FIGS. being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
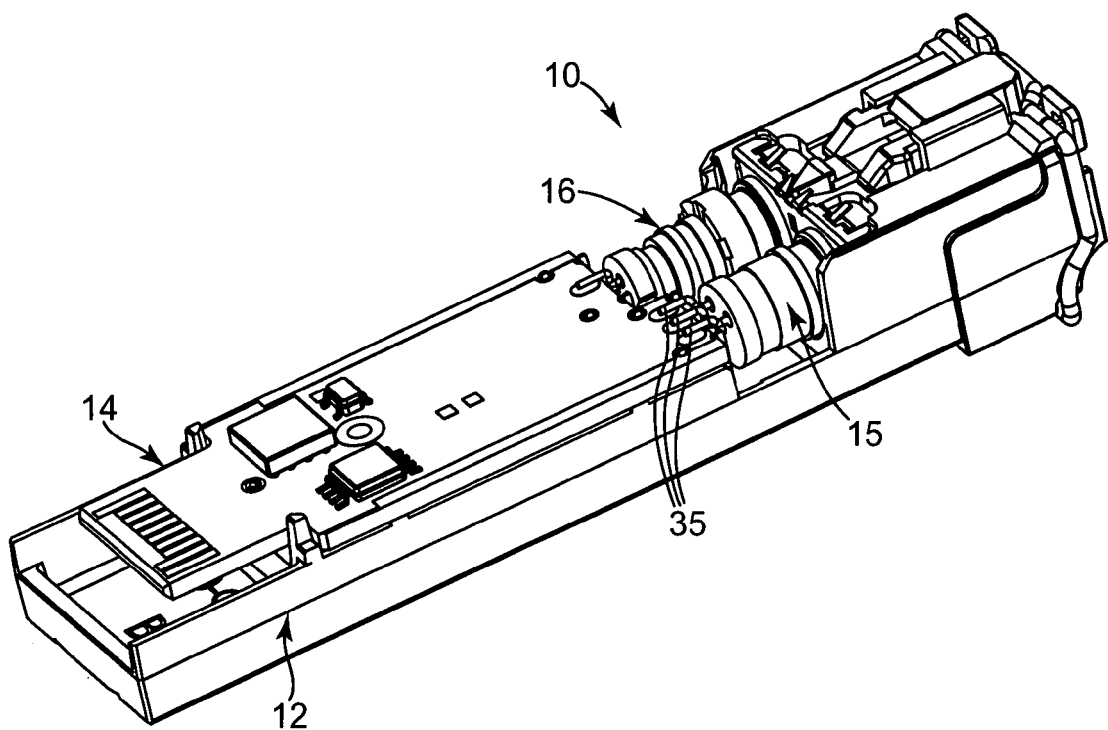
FIG. 1 is a perspective view of a transceiver module including an optical subassembly in accordance with one embodiment of the present invention.

FIG. 1 illustrates transceiver module 10 in accordance with one embodiment of the present invention. Transceiver module 10 includes housing 12, printed circuit board 14, first optical subassembly 15, and second optical subassembly 16. In operation, the various components of transceiver module 10 are assembled and then connected to optical connectors, such a fiber optic cable, on one side and to a host system, such as a router, computer or other electrical device, on another. Transceiver module 10 then transforms electrical signals to optical signals and/or transforms optical signals into electrical signals. Most often, two optical subassemblies 15 and 16 are placed within transceiver module 10, one a transmit subassembly and one a receive subassembly. It is also possible to have a single optical subassembly in accordance with the present invention as well.

Printed circuit board 14 is mounted to housing 12 and optical subassemblies 15 and 16 are mounted between circuit board 14 and a forward or nose portion of housing 12. Optical subassemblies 15 and 16 are mounted such that one end of each can be coupled to the circuit board 14 and another end of each couples into the nose portion of housing 12. Optical subassemblies 15 and 16 may be secured by a seat or nest on housing 12 such that they are mechanically supported thereon.

Circuit board 14 carries various components thereon. Typically, these components include semiconductor chips and related electrical circuitry that facilitate the processing of electrical and optical signal conversion. Optical subassemblies 15 and 16 illustrated in FIG. 1 include pins 35 projecting from the subassemblies that are connected directly to circuit board 14. Alternatively, flex leads (not shown in FIG. 1) that are made of a conducting material can be used and configured to electrically couple circuit board 14 with optical subassemblies 15 and 16.

In one embodiment, one of optical subassemblies 15 and 16 functions as an optical transmitter and the other functions as an optical receiver, and each include subassembly pins 35. Pins 35 are electrically coupled to circuit board 14 when transceiver module 10 is fully assembled. Optical subassemblies 15 and 16 may include a photodiode or similar optical receiver, for transforming optical signals to electrical signals. Optical subassemblies 15 and 16 may also, or alternatively, include a laser, pin diode, or a similar optical emitter for transforming electrical signals to optical signals. In one alternative embodiment, a single optical subassembly is used, the single optical subassembly being a bidirectional optical subassembly. In this case, the components for both transmitting and receiving are contained within the single optical subassembly. Whether an optical subassembly is functioning as an optical transmitter or as an optical receiver, it will contain some sort of optoelectronic device, such as a photodiode or a laser.

Figure 2A:
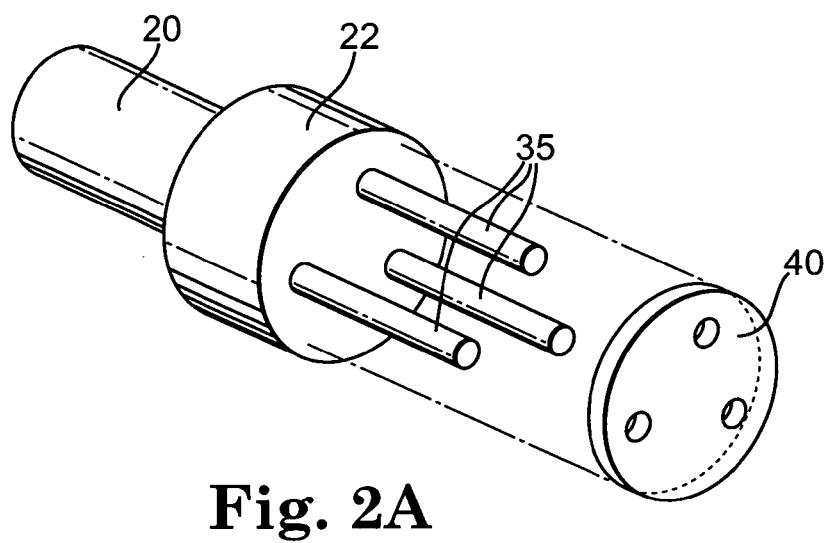
FIG. 2A illustrates an exploded view of a portion of an optical subassembly including a decoupling disk in accordance with one embodiment of the present invention.
Figure 2B:
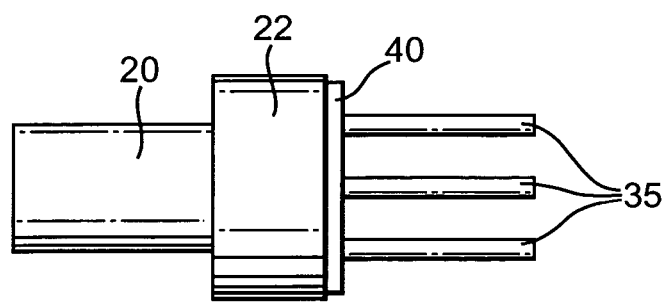
FIG. 2B illustrates a cross-section of a portion of an optical subassembly including a decoupling disk in accordance with one embodiment of the present invention.

FIGS. 2A and 2B illustrates a portion of optical subassembly 16 with a decoupling disk 40 in accordance with one embodiment of the present invention. FIG. 2A is an exploded view, while FIG. 2B illustrates a cross-sectional view. As those of ordinary skill in the art will understand, decoupling disk 40 is also connectable to optical subassembly 15 in the same way, but for succinctness of description, a single subassembly will be illustrated.

The portion of optical subassembly 16 illustrated includes subassembly barrel 20, optical can 22 and decoupling disk 40. Optical can 22 includes an end surface from which pins 35 project. Optical can 22 is a cylindrical can containing a laser or pin diode used for optical conversion. Typically, there is also a lens over the top of the laser or diode such that optical can 22 forms a thematic enclosure. Optical can 22 may be, for example, a TO-can. Decoupling disk 40 includes holes through which pins 35 extend.

With the present invention, decoupling disk 40 is assembled over the end of optical can 22 and over pins 35. Decoupling disk 40 provides a planar decoupler with superior decoupling capacitance as close to the source of the noise as possible without using internal decoupling circuitry. In addition, because of its planar design, decoupling disk 40 provides superior capacitance with minimal inductance. Its specific shape may be tailored to the specific optical subassembly to which it is attached, making decoupling disk 40 a flexible design option for providing decoupling in optical subassemblies.

Figure 3:
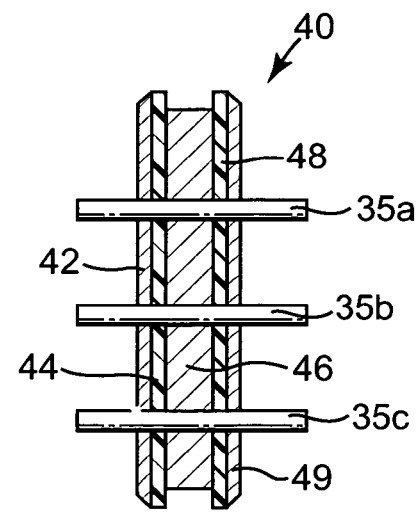
FIG. 3 illustrates a cross-section of a decoupling disk in accordance with one embodiment of the present invention.

FIG. 3 illustrates a cross-sectional view of decoupling disk 40 in accordance with one embodiment of the present invention. Decoupling disk 40 is planar and comprises several layers and pins 35 are illustrated extending through the layers. In one embodiment, decoupling disk 40 is symmetrical and includes first insulating layer 42, first metal layer 44, dielectric layer 46, second insulating layer 48, and second metal layer 49. In this way, with a dielectric layer 46 sandwiched between two metal layers 44 and 49, decoupling disk 40 forms a planar decoupler.

In one embodiment, pin 35a may be coupled to a source voltage $V_{cc}$, pin 35b to ground, and pin 35c to a source signal. In one case, pin 35a may be coupled to first metal later 44 and pin 35b may be coupled to second metal layer 48 such that there is good planar decoupling between $V_{cc}$ and ground. In alternative cases, only pin 35a may be coupled to first metal later 44 or only pin 35b may be coupled to second metal layer 48 such that there is good planar decoupling between $V_{cc}$ or ground and the optical subassembly itself. In yet other cases, it may be desirable to have ground-to-ground decoupling such that ground is coupled to metal layers 44 and 48 on either side of dielectric 46. This case may be particularly useful when ground bounce is at issue in the transceiver device.

In an alternative embodiment of decoupling disk 40 in accordance with the present invention, fewer layers may be used. For example, in one case only dielectric layer 46, metal layer 48 and insulation layer 49 are used. In this case, where optical can 22 is metallic, the capacitive effect of decoupling disk 40 is still realized with dielectric layer 46 sandwiched between two metal layers, the two metal layers in that case being the end surface of optical can 22 and metal layer 48. Those of ordinary skill in the art will see that other layer combinations are possible in accordance with the present invention.

The capacitance of decoupling disk 40 may be calculated using the known relationship of capacitance in parallel plate capacitors: $C=(k*\in_0*A)/d$, where k=relative permittivity of the dielectric material (layer 46) between the plates, $\in_0$=permittivity of space, A=the area of the metal plates, and d=the distance between the plates. In one embodiment, where Mylar® is used as dielectric material, the capacitance is given as $C=2.25\times10^{-13}*\in_0*A)/d$.

Figure 4A:
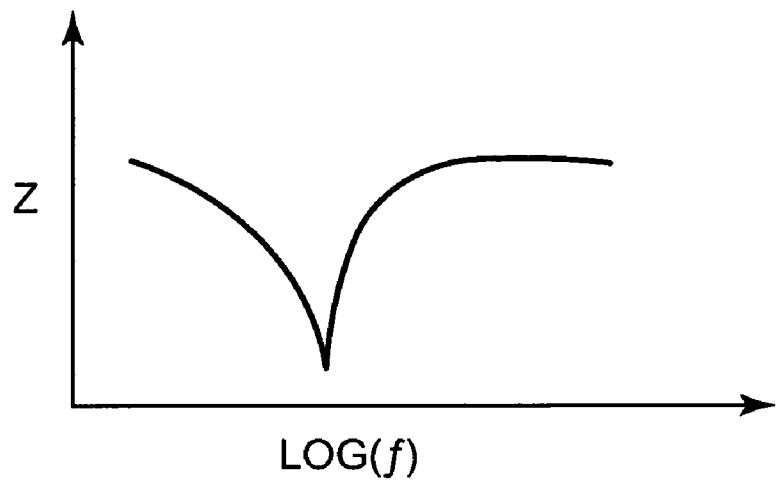
FIG. 4A is an exemplary graph illustrating impedance versus frequency for an internal decoupling capacitor.
Figure 4B:
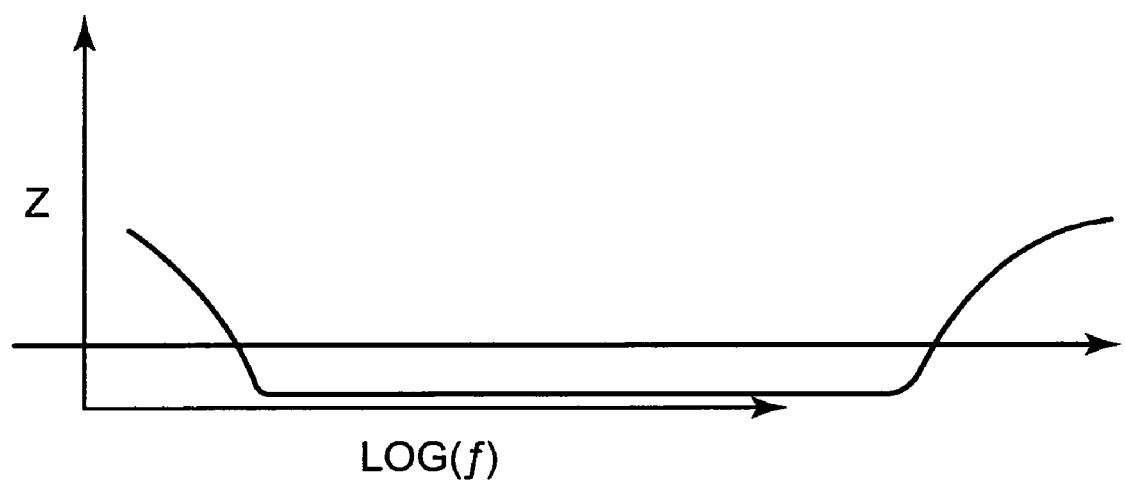
FIG. 4B is an exemplary graph illustrating impedance versus frequency for a decoupling disk in accordance with one embodiment of the present invention.

Decoupling disk 40 has advantages in many embodiments in that its planar characteristic may avoid resonating at relatively low frequencies. FIGS. 4A and 4B illustrate the relatively favorable characteristics of a transceiver using decoupling disk 40 in accordance with the present invention. FIG. 4A illustrates impedance versus frequency for an internal decoupling capacitor. As is evident for the internal decoupling capacitor, although impedance decreases initially, it then resonates at a relatively low frequency.

On the other hand, FIG. 4B illustrates impedance versus frequency for a decoupling disk in accordance with one embodiment of the present invention. For this planar decoupling, impedance goes down, and then it does not begin to start moving up until a much higher frequency is attained. In this way, a transceiver using planar decoupling disk 40 is a much more effective at reducing noise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An optical transceiver comprising:
   a housing;
   a circuit board coupled within the housing;
   an optical subassembly having a can and a barrel, the optical subassembly coupled within the housing; and
   a decoupling device coupled to the can of the optical subassembly, wherein the decoupling device has a plurality of planar layers including a dielectric layer and at least a first metallic layer.

2. The optical transceiver of claim 1, wherein the can of the optical subassembly has an end surface that is metallic such that the metallic end surface, the dielectric layer and the first metallic layer form a planar capacitor.

3. The optical transceiver of claim 1 further including a plurality of pins extending from the can of the optical subassembly, wherein at least one of the pins is electrically coupled to the first metallic layer.

4. The optical transceiver of claim 3, wherein a first pin of the plurality of pins is coupled to a source voltage $_{cc}$, wherein a second pin of the plurality or pins is coupled to ground, and wherein at least one of the first and second pins are coupled to the first metallic layer.

5. The optical transceiver of claim 4, wherein a third pin of the plurality of pins is coupled to a carrying signal.

6. The optical transceiver of claim 1, wherein the decoupling device further includes a second metallic layer.

7. The optical transceiver of claim 6, wherein the first metallic layer, the dielectric layer and the second metallic layer form a planar capacitor.

8. The optical transceiver of claim 1, wherein the decoupling device further includes a first and a second insulating layer outside the first and second metallic layers.

9. The optical transceiver of claim 1 further comprising a second optical subassembly.

10. The optical transceiver of claim 9, wherein the second optical subassembly includes a can and a barrel and a second decoupling device coupled to the can of the second optical subassembly.

11. The optical transceiver of claim 1, wherein the dielectric is made of Mylar®.

12. The optical transceiver of claim 1, wherein the transceiver is a small form factor transceiver.

13. An optical transceiver comprising:
housing;
a circuit board coupled to the housing;
an optical subassembly having a can and a barrel, the optical subassembly configured within the housing and coupled to the circuit board;
wherein optical signals within the optical subassembly are converted to electrical signals and transmitted to the circuit board; and
wherein electrical signals from the circuit board are transmitted to the optical subassembly for converting to optical signals; and
means for decoupling electrical signals transmitted in the optical assembly, wherein the means for decoupling electrical signals includes a decoupling device having a plurality of planar layers including a dielectric layer and at least a first metallic layer.

14. The optical transceiver of claim 13, wherein the can of the optical subassembly has an end surface that is metallic such that the metallic end surface, the dielectric layer and the first metallic layer form a planar capacitor.

15. The optical transceiver of claim 13 further including a plurality of pins extending from the can of the optical subassembly, wherein at least one of the pins is electrically coupled to the first metallic layer.

16. The optical transceiver of claim 15, wherein a first pin of the plurality of pins is coupled to a source voltage $V_{cc}$, wherein a second pin of the plurality of pins is coupled to ground, and wherein at least one of the first and second pins are coupled to the first metallic layer.

17. The optical transceiver of claim 13, wherein the decoupling device further includes a second metallic layer.

18. The optical transceiver of claim 17, wherein the first metallic layer, the dielectric layer and the second metallic layer form a planar capacitor.

* * * * *

UNITED STATES PATENT AND TRADEMARK OFFICE
CERTIFICATE OF CORRECTION

PATENT NO. : 7,198,414 B2  Page 1 of 1
APPLICATION NO. : 11/021475
DATED : April 3, 2007
INVENTOR(S) : Nelson Diaz It is certified that error appears in the above-identified patent and that said Letters Patent is hereby corrected as shown below:

Column 3
Line 12, change "illustrates" to --illustrate--
Line 53, change "later" to --layer--
Line 54, change "48" to --49--
Line 57, change "48" to --49--
Line 61, change "48" to --49--
Line 67, after "metal layer", change "48" to --49--
Line 67, after "insulation layer", change "49" to --48--

Column 4
Line 5, change "48" to --49--
Line 57, claim 3 before "further", insert --,--

Column 5
Line 9, claim 9 before "further", insert --,--

Column 6
Line 13, claim 15 before "further", insert --,--

Signed and Sealed this

Ninth Day of September, 2008

JON W. DUDAS
*Director of the United States Patent and Trademark Office*